May 16, 1961　　　R. S. RANSOM　　　2,984,113
PIVOT ASSEMBLIES
Filed April 27, 1960

Richard S. Ransom
Inventor
By Cushman, Darby & Cushman
Attorneys

United States Patent Office 2,984,113
Patented May 16, 1961

2,984,113

PIVOT ASSEMBLIES

Richard Sutton Ransom, Holywood, Northern Ireland, assignor to Short Brothers & Harland Limited, Belfast, Northern Ireland, a British company Filed Apr. 27, 1960, Ser. No. 24,997

Claims priority, application Great Britain Dec. 29, 1959

12 Claims. (Cl. 74—5)

The present invention relates to pivot assemblies and is particularly though not exclusively concerned with pivot assemblies for supporting pivoted components in gyroscopic apparatus.

In gyroscopic apparatus which has been proposed the pivoted component, which may be the gyroscope rotor or one of the gimbals, is supported at its ends by pivot members screwed into their supports in such a way that they can be moved, by screwing, in the direction of the pivotal axis to effect adjustment of the pivoted component to a balancing position in relation to the remainder of the apparatus. It has been found that with such an arrangement, where conventional threads are used on the pivot members with conventional complementary threads on the support, an accurate adjustment of the pivoted component cannot be made because of the presence of back-lash in the threads and difficulty in achieving concentricity.

It is one object of the present invention to provide a pivot assembly for a pivoted component, which does not suffer from the above disadvantages and permits an accurate and sensitive adjustment to be made of the axial position of a pivoted component.

According to the present invention there is provided a pivot assembly for pivotally supporting a pivoted component in relation to a supporting structure, said assembly comprising a screw-threaded pivot member adjustably positioned in the supporting structure, a deformable pellet slidable within the structure to engage the thread on the pivot member and biasing means for biasing the deformable pellet against the thread to form a face thereon conforming to the thread.

Further according to the present invention a method of assembling a pivoted component comprises the steps of supporting the pivoted component on the pivot member, biasing the deformable pellet so that it engages with the thread on the pivot member and is deformed thereby, making an adjustment of the position of the pivoted component by screwing the pivot member in the threads formed in the pellet, and finally intensifying the biasing of the pellet to such an extent that said pellet prevents further movement of the pivot member.

One embodiment of the invention will now be described by way of example with reference to the accompanying drawing in which.

Figure 1:
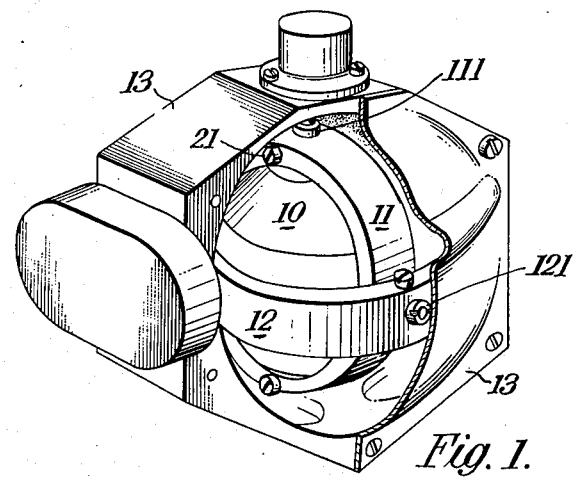
Fig. 1 is a part cut away perspective view of gyroscopic apparatus embodying pivot assemblies according to the invention.

Referring first to Fig. 1 the gyroscope shown therein comprises an approximately spherical rotor 10 which is supported in two conventionally disposed inner and outer gimbals 11 and 12 which are respectively arranged to pivot about axes which intersect at right angles to each other. The rotor 10 is rotatably mounted within the inner gimbal 11 on two pivot assemblies carried by the inner gimbal 11. One of these assemblies is indicated by the reference numeral 111. The inner gimbal 11 is rotatably mounted within the outer gimbal 12 on pivot assemblies carried by the gimbal 12. One of the latter assemblies is indicated by the reference numeral 121. The outer gimbal 12 is rotatably mounted within the casing 13 on pivot assemblies (not shown).

The rotor 10 houses a combustion chamber in which is provided a combustible charge and an electric igniter or primer. The walls of the rotor 10 are pierced by two diametrically opposed passages. These passages are arranged tangentially with respect to the rotor axis and constitute jet discharge nozzles such that the reaction of gases generated by combustion of the charge will be effective to impart rotatory driving motion to the rotor 10.

Figure 2:
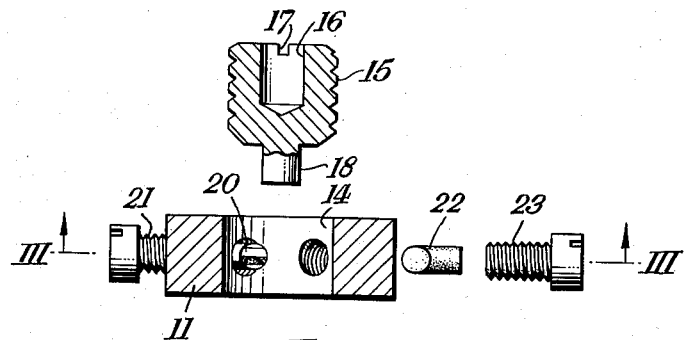
Fig. 2 is a scrap sectional exploded view of one of the rotor-supporting pivot assemblies embodied in the apparatus shown in Fig. 1.

Each of the pivot assemblies for supporting the rotor 10 and the inner and outer gimbals 11 and 12 are of the same form and constitute a pivot assembly according to the invention. The pivot assembly 111 shown in Fig. 1 is also shown in an enlarged exploded view in Fig. 2 and will now be described in detail. Referring to Fig. 2, the inner gimbal 11 is accurately bored to provide a plane hole 14 passing through said gimbal along the axis of the rotor 10. Into the hole 14 there is inserted a pivot member 15 which takes the form of a headless screw, the threads of which are truncated on the outside diameter. The pivot member 15 is provided at one end with an axial bore 16, the purpose of which will hereinafter be described, and a diametrical end slot 17 for a screwdriver. At its other end, the pivot member 15 is provided with a concentric spigot 18 which is adapted to engage in bearings carried by the rotor 10. The pivot member 15 is so constructed as to be slidable with a good fit within the hole 14.

Figure 3:
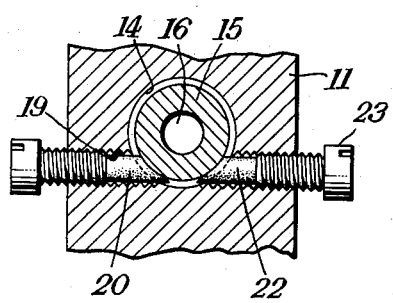
Fig. 3 is a sectional scrap view of the detail shown in Fig. 2, taken on the line III—III of Fig. 2.

Referring now to Fig. 3, there is also formed in the gimbal 11 a small screw-threaded hole 19 which communicates as shown with the hole 14. The screw-threaded hole 19 extends through the gimbal 11 in a direction parallel to the axis of the gimbal and perpendicular to the axis of the hole 14. Into one end of the hole 19 there is inserted a pellet 20 of a plastics material such as nylon and a locking screw 21 is screwed into the hole 19 to retain the pellet therein. In like manner a further pellet 22 is inserted in the other end of the hole 19 and is held therein by a locking screw 23.

The pivot assembly supporting the other end of the rotor 10 is of substantially the same form as that shown in Figs. 2 and 3. The balancing of the rotor 10 with respect to the gimbal 11 is carried out by adjustment of the positions of the two pivot members of these two assemblies. Initially the rotor is positioned within the gimbal 11 and the pivot member 15 of each assembly is pushed into engagement with the rotor bearings. With the pivot member 15 within the mounting hole 14, the locking screws 21 and 23 are screwed down lightly so as to bring the pellets 20 and 22 into engagement with the truncated thread on the pivot member. The end faces of the pellets 20 and 22 which engage the threads partially conform to the shape of these threads. With the pellets 20 and 22 so positioned and deformed the balancing of the rotor 10 with respect to the gimbal 11 is then carried out by adjustment of the positions of the pivot members by screwing thereof within the gimbal 11. The pressure applied to the pellets by the locking screw at this stage of the assembly is such as to give a backlash-free yet sensitive adjustment of the pivot members.

When the final balancing adjustment has been made, the tightening of the locking screws 21 and 23 is intensified so that the end face of each pellet positively locks and prevents further axial or radial movement of the pivot member.

As shown in Fig. 3, the pellet-retaining hole 19 is so disposed in relation to the pivot member mounting hole 14 that the pellets 20 and 22 bear down upon one side of the pivot member 15. The pivot member 15 is thus forced against one side of the mounting hole 14 thereby ensuring accuracy of alignment of the rotor. With this arrangement the innermost end of each pellet is, as shown in Fig. 2, cut away to provide an inclined face which engages the screw-threaded surface of the pivot member 15 tangentially.

The axial bore 16 in the pivot member 15 is provided to receive a pin of a caging device (not shown) which serves to lock the gyroscope until the rotor has reached operating speed.

What I claim as my invention and desire to secure by Letters Patent is:

1. A pivot assembly for pivotally supporting a pivoted component in relation to a supporting structure, said assembly comprising a screw-threaded pivot member adjustably positioned in the supporting structure, a deformable pellet slidable within the structure to engage the thread on the pivot member, and biasing means for biasing the deformable pellet against the thread to form a face thereon conforming to the thread.

2. An assembly according to claim 1, said supporting structure having a hole therein, wherein said screw-threaded pivot member is slidably mounted within the hole, and wherein said biasing means urges said pellet against the thread on said pivot member to cause said pellet to form a face thereon conforming to the thread on said pivot member, and holds said pellet so that the deformed face thereof bears against said pivot member and prevents axial movement of said pivot member in the hole except by the screwing of said pivot member.

3. An assembly according to claim 2, wherein the thread on the pivot member is truncated on the outside diameter.

4. An assembly according to claim 2, said supporting structure including a pellet retaining hole comunicating with the pivot member mounting hole, wherein said deformable pellet is slidably mounted within said pellet retaining hole, and wherein said biasing means moves said pellet in the pellet retaining hole into engagement with the thread on said pivot member.

5. An assembly according to claim 4, wherein the axis of the pellet-retaining hole is directed in a plane perpendicular to the axis of the pivot member mounting hole.

6. An assembly according to claim 5, wherein the pellet-retaining hole is arranged to communicate with the pivot member mounting hole so that the direction of the thrust on the pellet, when biased, does not pass through the centre of the pivot member mounting hole.

7. An assembly according to claim 6, comprising a further deformable pellet arranged to cooperate with the pivot member in the same manner as the first-mentioned pellet in a further pellet-retaining hole, and further means for biasing the further pellet.

8. An assembly according to claim 7, wherein the thrusts on the two pellets are along the same line in opposite senses.

9. An assembly according to claim 4, wherein the pellet-retaining hole is screw-threaded and the biasing means comprises a screw screwed therein.

10. Gyroscopic apparatus comprising a gimbal frame pivotally supported by a pivot assembly carried by a supporting structure, said assembly comprising a screw-threaded pivot member adjustably positioned in the supporting structure, a deformable pellet slidable within the structure to engage the thread on the pivot member and biasing means for biasing the deformable pellet against the thread to form a face thereon conforming to the thread.

11. Gyroscopic apparatus comprising a rotor rotatably supported by a pivot assembly carried by a supporting gimbal, said assembly comprising a screw-threaded pivot member adjustably positioned in said gimbal, a deformable pellet slidable within said gimbal to engage the thread on the pivot member and biasing means for biasing the deformable pellet against the thread to form a face thereon conforming to the thread.

12. A method of adjusting a pivoted component in a pivot assembly comprising: steps of supporting the pivoted component on spaced apart screw-threaded pivot members adjustably positioned in a supporting structure, biasing a deformable pellet against the thread on each pivot member whereby the pellet is deformed, adjusting the position of the pivoted component by screwing the pivot members in the threads formed in the pellets, and increasing the biasing force on the pellets to such an extent that the pellets prevent further movement of the pivot member.

References Cited in the file of this patent

UNITED STATES PATENTS

| 648,878 | Obry | May 1, 1900 |
| 1,974,220 | Sperry | Sept. 18, 1934 |
| 2,189,375 | Sylvander | Feb. 6, 1940 |
| 2,725,750 | Togstad | Dec. 6, 1955 |